March 19, 1963 — W. S. HOLLOWAY — 3,081,649
CUTTER ASSEMBLY FOR BORING BAR
Filed March 31, 1960
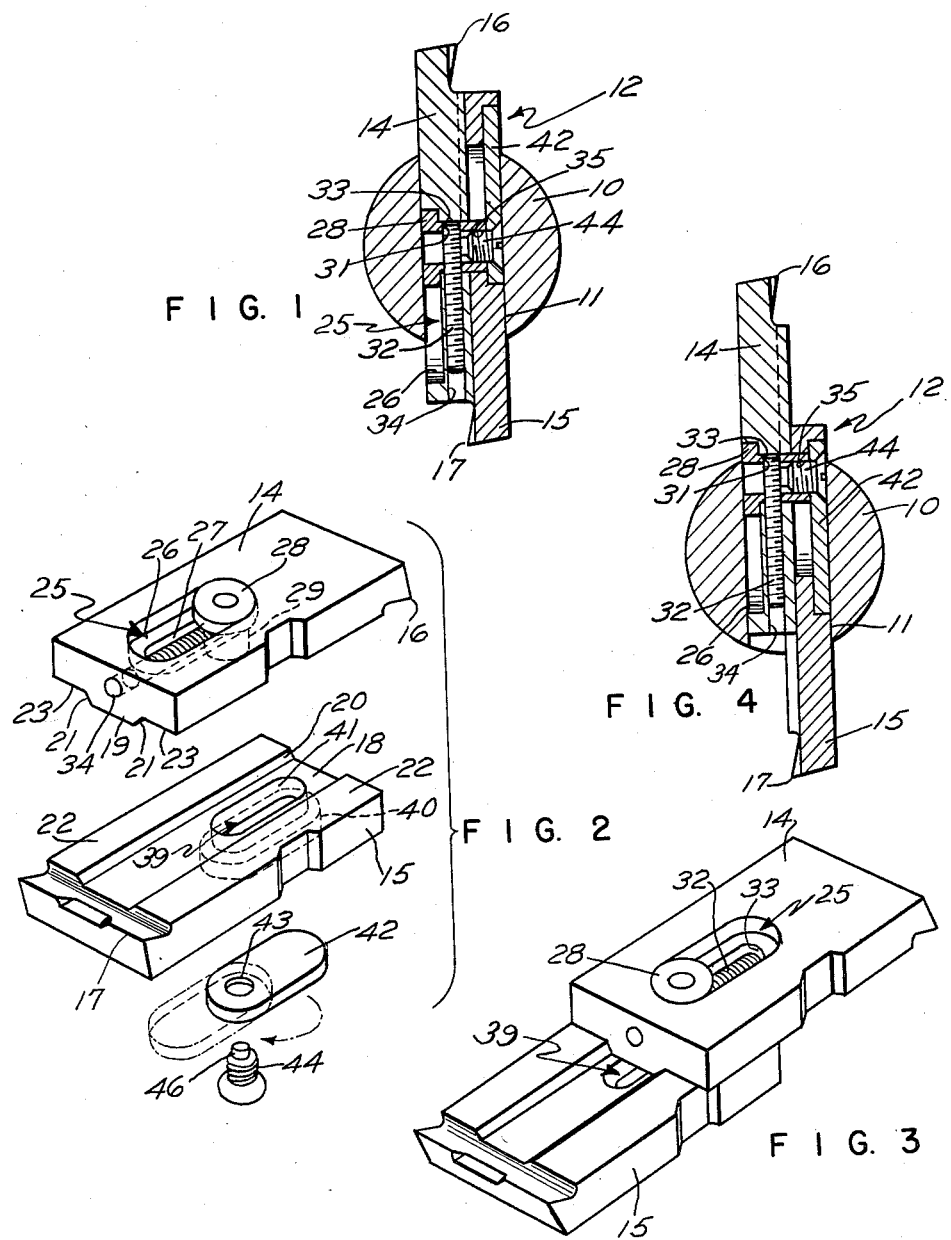
INVENTOR.
WILLIAM S. HOLLOWAY
BY
Barlow & Barlow
ATTORNEYS … # 3,081,649
CUTTER ASSEMBLY FOR BORING BAR
Williams S. Holloway, Cumberland Hill, R.I., assignor to Madison Industries Inc., a corporation of Michigan
Filed Mar. 31, 1960, Ser. No. 19,044
1 Claim. (Cl. 77—58)

This invention relates to an improved boring bar construction and particularly to the cutter assembly therefor.

Basically, boring bars or reamers, as they are sometimes called, assumes a fairly standard configuration and include a cylindrical bar having a transverse opening therethrough to receive the cutter or cutter assembly. Also in order to enable the cutter assembly to be adjusted, two complemental blades are provided which slide relatively one to the other. For reference purposes, a common form of a boring bar assembly is disclosed in the Madison Patent No. 1,118,141 and the Miller Patent No. 2,742,800. One of the problems associated with this general type of cutter assembly, as disclosed in these two patents, is that the limit of adjustment between the two cutting faces is restricted by the length of the adjustment screw. In each of these patents it will be noted that the adjustment screw is of relatively minimal length and no way is provided to increase the adjustment between the cutting faces except to lengthen the screw which would necessitate, in effect, weakening the structure by virtue of having to cut away more stock. It will be apparent that in a cutter assembly any portion of the cutter itself which is cut away effectively weakens the body structure.

It is accordingly an object of this invention to provide a cutter assembly which will have greater adjustment between the cutting blades thereof for any one given size.

A further object of the invention is to provide an adjustment means for the blades of the cutter assembly which will utilize a movable plate in a counterbored slot as an anchor for one element of the binding and locking post assembly.

With these and other objects in view the invention consists of certain novel features of construction as will be more fully described and particularly pointed out in the appended claim.

In the accompanying drawings:

FIGURE 1 is a sectional view taken through a cutter assembly that is inserted within a boring bar;

FIGURE 2 is an exploded perspective view of the cutter assembly;

FIGURE 3 is a perspective view of the cutter assembly showing it at maximum extension; and FIGURE 4 is a sectional view similar to FIGURE 1 showing the cutter assembled for maximum extension.

Referring now to the drawings, 10 designates a boring bar which is provided with the usual transverse opening 11 to receive a cutter assembly generally designated 12. The cutter assembly basically consists of two substantially equally dimensional rectangular blade members 14 and 15 which are provided at their outer edges with cutting portions 16 and 17 respectively. These cutting portions or edges may be suitably formed in accordance with techniques well known in the art to provide an edge that will be substantial and which will give relatively long life. To maintain the two cutting edges in alignment, there is provided a longitudinal way or recess 18 in the blade member 15 and a corresponding tongue or projection 19 on the blade member 14. The sides 20 of the recess 18 and the sides 21 of the tongue 19 are machined to be accurately complemental and at the same angle with respect to the faces 22, 23 of the blade members 15 and 14 respectively. Additionally, the depth of the recess 18 is such as related to the height of the tongue 19 that bottoming of the tongue in the recess 18 is prevented. The structure thus far described will result in a pair of cutter blades 14 and 15 which slide relative to each other only along the edges 20, 21 and which will maintain longitudinal parallelism between the two blades.

To maintain parallelism of the two cutting edges 16 and 17, the surface 22 of the cutter blade 15 is left perfectly flat and is parallel to a plane containing the edge 17. The corresponding surface 23 on the cutter 14, however, may be either planal or may contain one or more tongues projecting therefrom which are ground flat and parallel to a plane containing cutting edge 16. If this alternate construction is utilized, it will be in accordance with the disclosure contained in a co-pending application of E. B. Farndale, Serial No. 147,243, filed October 24, 1961. The purpose of providing the projection of ribs is to minimize the frictional engagement between the two cutter parts and still maintain the required precision of mating.

In order to adjust the two cutter blades relative to each other, a recess 25 is cut into the blade 14 which recess takes the form of a counterbore providing a shelf portion 26 and a thru slot 27. By this construction the enlarged head of a binding post 28 may be received in the shelf portion 26 and the body 29 of this nut will pass through the slot 27. A threaded crossbore is provided in the nut 28 as at 31 for receiving an adjusting screw 32 located within a bore 34 in the blade 14 which screw has the end thereof bearing against wall 33 of the slot 27. Additionally the end of the nut as at 35 is internally threaded to receive a locking screw 44. The other blade 15 is also provided with a recess 39 consisting of a counterbored or shouldered portion 40 and a slot portion 41. Within the shouldered portion 40 there is received an oblong plate member 42 having an aperture 43 at one end thereof. Through the hole 43 there passes a locking screw 44, the threads of which are adapted to engage the internal threaded bore 35 of the binding post 28. Accordingly, with the nut in position, the screw 44 in effect fastens the two cutter blades 15 and 14 together in face-to-face engagement. The tip of the screw 44 may be provided with some resilient material such as 46 which abuts the adjusting screw 42 and when the screw 44 is turned up hard, it will be held in position against loosening from vibration.

To obtain maximum adjustment between the cutter blade assemblies, let us note that in the position of the parts in FIGURE 1 the member 42 is oriented so that the aperture 43 is inwardly of the cutter blade 15. By first loosening the screw 44 and rotating screw 32 for forward travel, the head of binding post 28 will travel to the other end of recess 25 and pressure exerted by screw 32 against wall 33 will slide blade 14 relative to blade 15, to move cutting portions 16, 17 apart. This then will permit relative adjustment between the blades up to the limit of the length of screw 32. If an additional spacing of the cutting portions 16, 17 is desired, the blades may be taken apart by loosening the screw 44 and the oblong member 42 turned as diagramed in FIGURE 2 to the position shown in FIGURE 4 whereupon the center of the aperture 43 will fall adjacent the outer edge of the cutter blade 15. The adjusting screw is returned to its original position and the blades reassembled. By again turning the adjusting screw 32 the cutting portions 16, 17 may be moved apart to the maximum extension shown in FIGURE 3. The total adjustment obtained is therefore effectively twice the length of slot 27.

It will therefore be seen that there is provided herein an adjustment means for a cutter assembly of a boring bar or the like which will maintain maximum adjustment between the parts with very simple manipulation that can be readily done in the field. Such a result will eliminate the necessity of stocking a larger variety of cutter assemblies to cover ranges of sizes or in terms of wear will provide an assembly that will cut twice as long. Further a minimum amount of stock has been cut away from each blade to maintain maximum rigidity.

I claim:

A cutting assembly for a boring bar or the like comprising a pair of first and second blades having cutting portions and overlapping each other, each of said blades having a slot therein with a counterbored shelf portion, a plate having at least one aperture therein located adjacent one end thereof, said plate received on the shelf of the slot in a first blade, a binding post means having a head, said head received on the shelf of the slot in the second blade, a fastening screw passing through said aperture and received in a threaded bore in said post, an adjusting screw passing through a crossbore in said post and bearing against the end of said slot in the second blade whereby said plate may be rotated 180° relative to said slot in the first blade to provide different ranges of blade adjustment.

References Cited in the file of this patent

UNITED STATES PATENTS 2,811,056    Hutto _____ Oct. 29, 1957